United States Patent
Kline et al.

(10) Patent No.: US 11,360,488 B2
(45) Date of Patent: Jun. 14, 2022

(54) DYNAMIC RELATIVE POSITION REASSIGNMENT OF VEHICLE IN AUTONOMOUS VEHICLES ECOSYSTEM

(71) Applicant: International Business Machines Corporation, Armonk, NY (US)

(72) Inventors: Eric V. Kline, Pine Island, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 16/735,774

(22) Filed: Jan. 7, 2020

(65) Prior Publication Data
US 2021/0208600 A1    Jul. 8, 2021

(51) Int. Cl.
G05D 1/02 (2020.01)
G01C 21/34 (2006.01)
B60W 30/16 (2020.01)

(52) U.S. Cl.
CPC ......... *G05D 1/0278* (2013.01); *B60W 30/162* (2013.01); *G01C 21/3476* (2013.01); *G05D 1/0223* (2013.01)

(58) Field of Classification Search
CPC .................................................. G01C 21/3476
See application file for complete search history.

(56) References Cited

U.S. PATENT DOCUMENTS

| | | | |
|---|---|---|---|
| 9,222,795 B1* | 12/2015 | Gerlach | G01C 21/3415 |
| 2010/0256836 A1 | 10/2010 | Mudalige | |
| 2013/0245877 A1* | 9/2013 | Ferguson | G05D 1/0214 701/23 |
| 2017/0192437 A1* | 7/2017 | Bier | G05D 1/0077 |
| 2017/0267256 A1 | 9/2017 | Minster et al. | |
| 2017/0276492 A1 | 9/2017 | Ramasay | |
| 2018/0095466 A1* | 4/2018 | Allan | G06V 20/58 |
| 2019/0304310 A1* | 10/2019 | Tao | G01S 13/931 |
| 2020/0042017 A1* | 2/2020 | Kelkar | G01S 5/0072 |
| 2020/0192365 A1* | 6/2020 | Russell | G06V 20/58 |
| 2020/0200556 A1* | 6/2020 | Boston | G01C 21/3644 |

OTHER PUBLICATIONS

"Automatic Lane Changing" Auto Beat:The Pulse of the Automotive Industry <URL: https://www.autobeatonline.com/articles/automatic-lane-changing> Feb. 15, 2016 (2 pages).
Conner Forrest "The obstacles to autonomous vehicles: Liability, societal acceptance, and disaster stories" ZDNet, <URL: https://www.zdnet.com/article/the-obstacles-to-autonomous-vehicles-liability-societal-acceptance-and-disaster-stories/> Feb. 1, 2018 (22 pages).
Tesla Life "Nick's Tesla—Auto Lane Change Feature—Be Careful" YouTube <URL: https://www.youtube.com/watch?v=mlxf7nPuXVo> Feb. 7, 2017 (7 pages).

* cited by examiner

*Primary Examiner* — Khoi H Tran
*Assistant Examiner* — Tristan J Greiner
(74) *Attorney, Agent, or Firm* — Cantor Colburn LLP; Tihon Poltavets (57) ABSTRACT

An autonomous vehicle system includes an autonomous vehicle in signal communication with a data server via a communication network. The autonomous vehicle is configured to travel autonomously according to a traveling route. The data server outputs at least one driving command to control the autonomous vehicle based, at least on in part, on a point of interest (POI) included in the traveling route and at least one surrounding vehicle located in a vicinity of the autonomous vehicle.

20 Claims, 6 Drawing Sheets

DYNAMIC RELATIVE POSITION REASSIGNMENT OF VEHICLE IN AUTONOMOUS VEHICLES ECOSYSTEM

BACKGROUND

The present invention generally relates to autonomous vehicles and, more specifically, to an operator interface for controlling one or more autonomous vehicles, an autonomous vehicle system and a method for operating one or more autonomous vehicles.

Autonomous vehicles are increasingly present on modern roadways and are often configured as cars or trucks that can be operated in a driver operated mode or a driverless in which the autonomous vehicles are operated substantially autonomously and without human interaction but in which the autonomous vehicles can still be at least partially operated by human interactions. In either mode, each autonomous vehicle is operated or driven according to road and environmental conditions, traffic conditions and pre-installed or recently installed driving rule sets that govern how each of the autonomous vehicles are to be driven and especially when they operate in the driverless modes.

SUMMARY

According to a non-limiting embodiment, an autonomous vehicle system includes an autonomous vehicle in signal communication with a data server via a communication network. The autonomous vehicle is configured to travel autonomously according to a traveling route. The data server outputs at least one driving command to control the autonomous vehicle based, at least on in part, on a point of interest (POI) included in the traveling route and at least one surrounding vehicle located in a vicinity of the autonomous vehicle.

According to another non-limiting embodiment, a method is provided to control one or more autonomous vehicles operating in an autonomous vehicle system. The method comprises establishing data communication between an electronic data server operating in a communication network including and an autonomous vehicle, and autonomously operating the autonomous vehicle along a traveling route. The method further includes determining a point of interest (POI) included along the traveling route. The method further includes outputting at least one driving command to control the autonomous vehicle based, at least on in part on, the POI and at least one surrounding vehicle located in a vicinity of the autonomous vehicle.

According to yet another non-limiting embodiment, an autonomous vehicle included an autonomous vehicle system comprises a wireless vehicle communication system and a vehicle control system. The wireless vehicle communication system is configured to exchange data with a remotely located electronic data server via a communication network. The vehicle control system is configured to autonomously drive the autonomous vehicle according to a traveling route. The data exchanged over the communication network includes at least one driving command received from the data server to control the autonomous vehicle based, at least on in part on, a point of interest (POI) included in the traveling route and at least one surrounding vehicle located in a vicinity of the autonomous vehicle.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, autonomous vehicles currently rely on human input to perform certain driving decisions. Accordingly, the precise position of the vehicle can be adjusted via human input. The ultimate goal of autonomous vehicles, however, is to fully control the operation of the vehicle without the need for a human vehicle operator.

Turning now to an overview of the aspects of the invention, one or more embodiments of the invention address the above-described shortcomings of the prior art by providing for an autonomous vehicle system capable of analyzing dimensions of vehicles, types of vehicles, position of various Point of Attractions (POI) around the road side, and/or current relative positions of each vehicles, and then determining if any vehicle is creating obstacle to other vehicle to view the POIs. If the POI is obstructed, the autonomous vehicle ecosystem dynamically re-positions one or more of the vehicles such that there is no obstacle to field of view the POIs by one or more of the vehicles.

Figure 1:
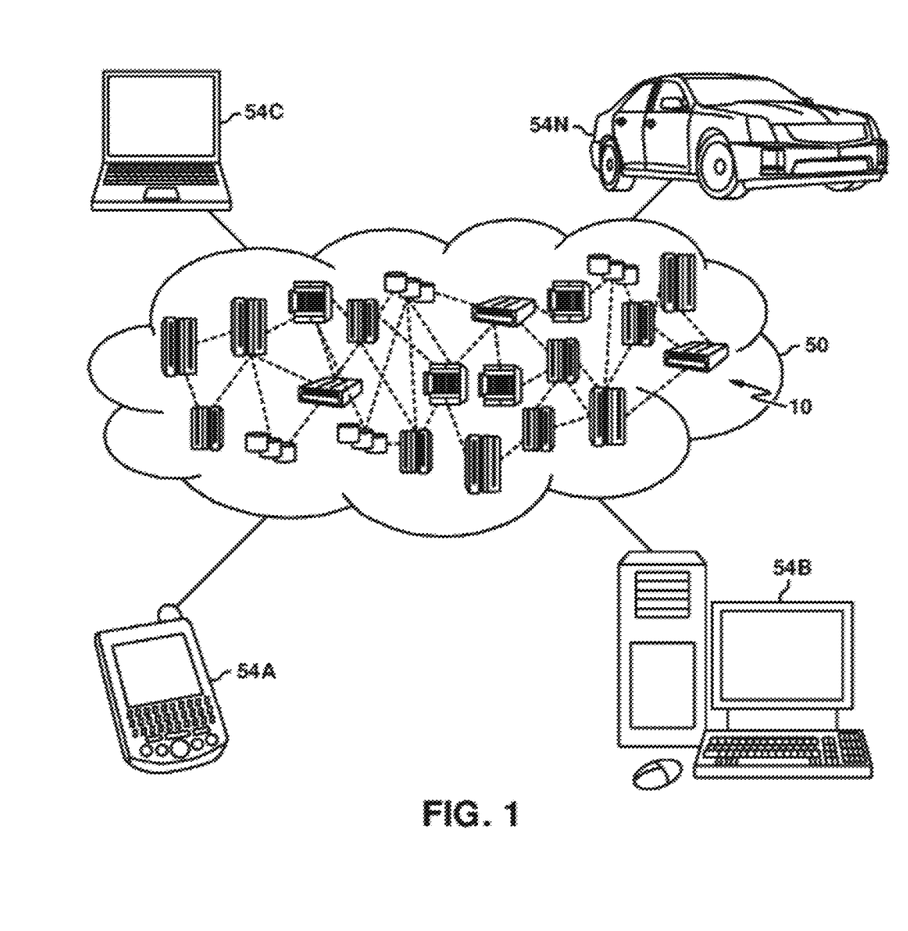
FIG. 1 depicts a cloud computing environment according to a non-limiting embodiment.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
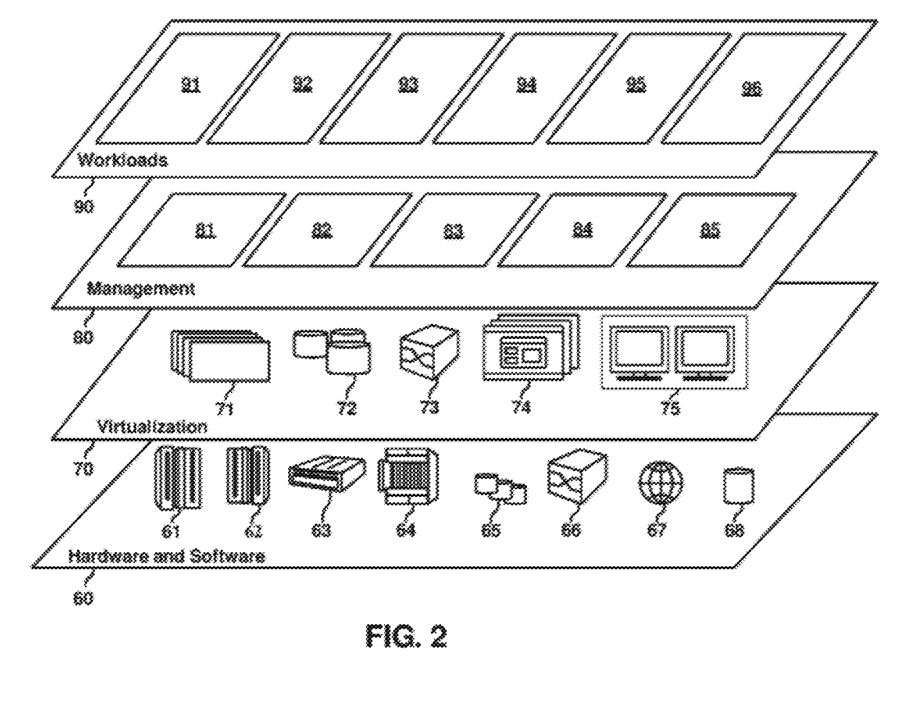
FIG. 2 depicts abstraction model layers according to a non-limiting embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an autonomous vehicle schedule processing 96.

Figure 3:
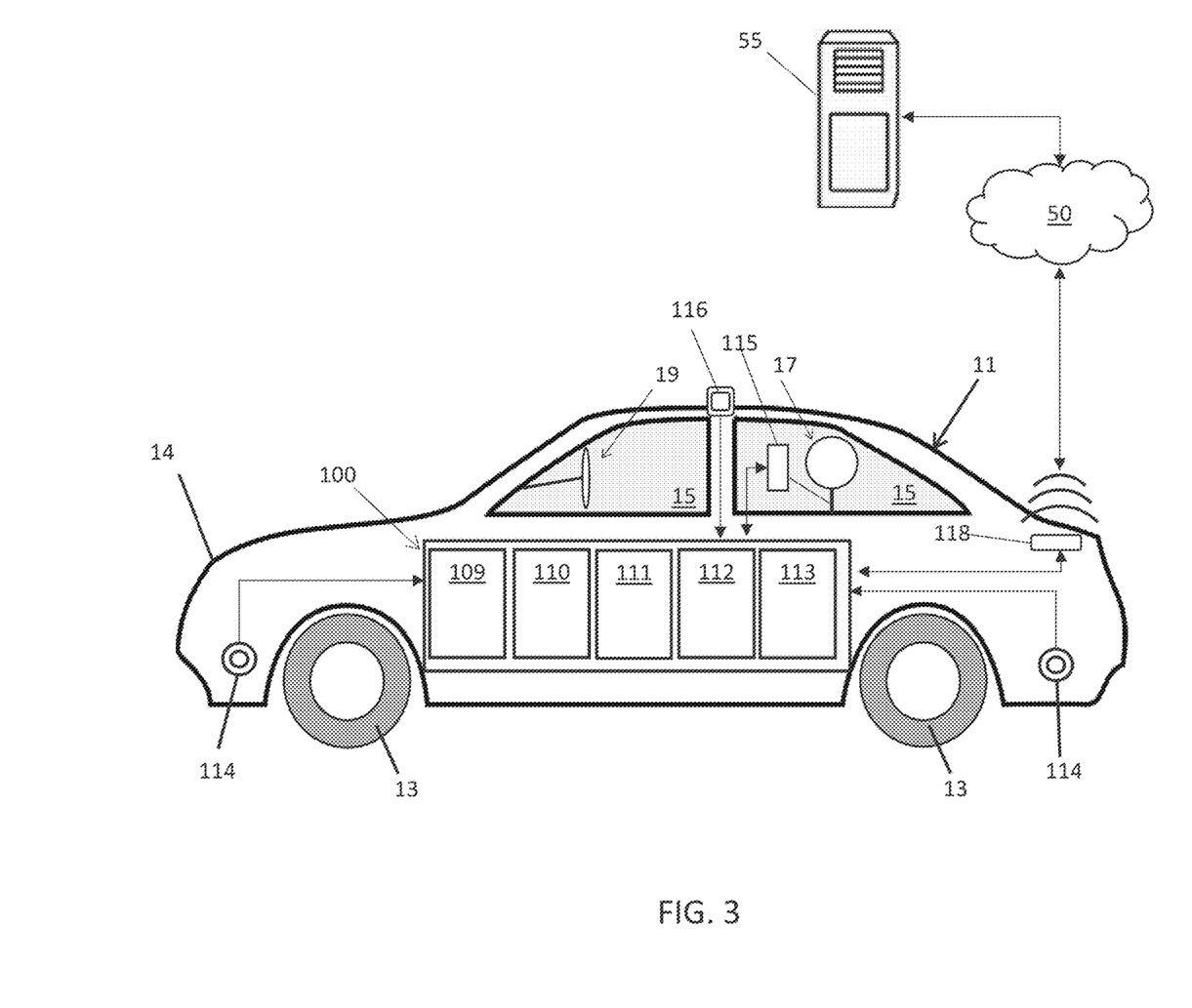
FIG. 3 depicts an autonomous vehicle according to a non-limiting embodiment.

With reference to FIG. 3, an autonomous vehicle 11 is illustrated according to a non-limiting embodiment. The autonomous vehicle 11 includes a body 14 that defines a cabin 15 to accommodate one or more passengers 17, along with an operator who may or may not be required for vehicle operations. The cabin 15 also includes steering and environmental control elements 19. The autonomous vehicle 11 further includes an electronic vehicle control system 100. The vehicle control system 100 includes a global position system (GPS) 109, a processing unit 110, a memory unit 111, an input/output (I/O) unit 112, and a servo control unit 113.

Among other functions, the I/O unit 112 controls the flow of data between the processing unit 110 and sensors 114 that monitor current road and environmental conditions. The I/O unit 112 can also exchange data between the vehicle control system 100 and a terminal device, e.g., a wireless device 115 operated by the passenger 17. Accordingly, a passenger 17 can input various requests such as, for example, a request to re-position the vehicle 11 in order to view a surrounding POI (not shown in FIG. 3). The passenger 17 can also utilize the wireless device 115 to dynamically indicate the presence of a POI 406, such as, for example, a sunrise or sunset, a specific vehicle, or other specific object surrounding the vehicle 11, or a particular event, e.g., fireworks.

The servo control unit 113 executes autonomous vehicle operation controls based on instructions and commands issued by the processing unit 110. In an exemplary case, the GPS can continuously determine the current location or position of the vehicle in real-time. The location not only includes the current geographical location of the vehicle 11, but also the current position of the vehicle 11 with respect to the road. For example, when driving on a multi-lane road, the GPS 109 can determine the current driving lane of the vehicle, along with the location of the other driving lanes surrounding the vehicle 11.

GPS data provided by the GPS 109 can also indicate various points of interest (POIs) of the surrounding area. In this manner the vehicle control system 100 may be aware of nearby POIs, even the POIs may be out of view or blocked by surrounding vehicles.

The sensors 114 can sense a speed of the autonomous vehicle 11 as well as road conditions and supply sensing results to the processing unit 110 via the I/O unit 112. The sensors 114 can also sense surround objects and the distance between one or more objects and the vehicle 11. The sensors can also include one or more image sensors 116. The image sensor 116 can include, but is not limited to, a camera 116. The camera 116 can capture images surrounding the vehicle 11 and output the captured images to the vehicle control system 100. In at least one non-limiting embodiment, the processing unit 110 can perform various image recognition operations that detect one or more POIs along with other surrounding vehicles included in the image provided by the camera 116.

The processing unit 110 can issue acceleration and steering instructions to the servo control unit 113 based on the GPS data, the sensing results and/or the image data. Based on the acceleration and steering instructions, the servo control unit 113 can control the steering of the wheels 13 and an output of the engine. In this manner, the vehicle control system 100 can autonomously operate the vehicle.

The memory units 111 can store various driving rule sets, along with executable instructions that are readable and executable by the processing unit 110. When the executable instructions are read and executed by the processing unit 110, the executable instructions cause the processing unit 110 to autonomously control various operations of the autonomous vehicle 11 based on the sensing results provided by the sensors 114 in an autonomous control mode or to control the various operations based on the sensing results provided by the sensors 114 and based on operator commands in a non- or semi-autonomous control mode.

The autonomous vehicle 11 further includes a wireless communication system 118. The wireless communication system 118 can wirelessly exchange data between other communication devices. The communication devices can include wireless nodes installed on objects surrounding the vehicle 11 and/or other surrounding vehicles that also include a wireless communication system. Accordingly, the autonomous vehicle 11 can exchange data with one or more surrounding vehicles, and the vehicle control system 100 can operate the autonomous vehicle based on the exchanged data. For example, the control system 100 can adjust the position of the vehicle 11 based data exchanged with one or more surrounding vehicles. In addition, the vehicle control system 100 can output data to the surrounding vehicles and request that they adjust their position with respect the autonomous vehicle as described in greater detail below.

The wireless communication system 118 can also exchange data with a communication network 50. The communication network can include a cloud computing environment 50, for example, which facilitates data exchange between the autonomous vehicle and various devices such as a data server 55, for example, operating in the cloud computing environment 50. The data server 55 can include a controller and memory. The controller can analyze data in the memory along with data provided by the autonomous vehicle 11, and output driving commands to control the vehicle 11 based on the analysis.

The cloud computing environment 50 can support an autonomous vehicle ecosystem capable of predicting if one or more vehicles surrounding the vehicle 11 are obstructing the view of a POI. When a POI is obstructed, the autonomous vehicle ecosystem can output driving commands to the autonomous vehicle 11 and/or other surrounding vehicles. Based on the driving commands, the autonomous vehicle 11 and/or other surrounding vehicles can be dynamically controlled such that the view of the POI is not obstructed.

Figure 4:
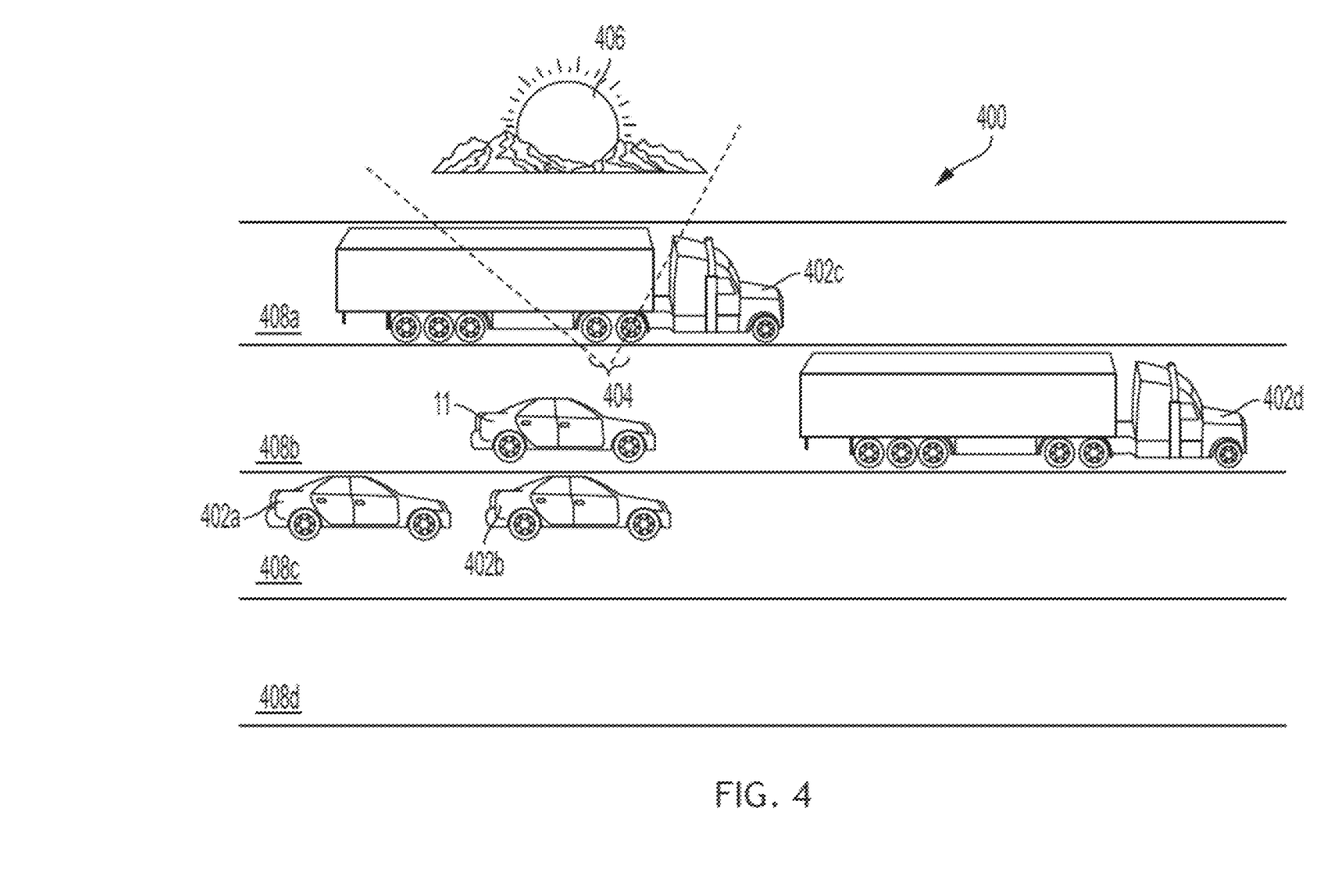
FIG. 4 illustrates a driving scenario including an obstructed point of interest.

Turning to FIG. 4, an autonomous vehicle ecosystem 400 is illustrated according to a non-limiting embodiment. The autonomous vehicle ecosystem 400 can control the operation of an autonomous vehicle 11, along with one or more other surrounding autonomous vehicles 402a, 402b, 402c and 402d located in the vicinity of the autonomous vehicle 11. The autonomous vehicle 11 and other surrounding autonomous vehicles 402a, 402b, 402c and 402d can wirelessly exchange data with one another while traveling along the road. The data includes, but is not limited to, vehicle speed, vehicle dimensions, upcoming lane changes, etc.

In the example shown in FIG. 4, surrounding vehicle 402c is located between a field of view (FOV) 404 of the autonomous vehicle 11 and a POI 406. The autonomous vehicle 11 is aware of the location of the POI 406 based on, for example, GPS data along and/or map information provided by a data server included in the cloud computing environment. The map information can include data regarding roads, surrounding businesses, POI data, etc. The POI data can include, for example, the location of the POI 406 with respect to the vehicles 11, 402a, 402b, 402c and 402d, along with the characteristics of the POI 406 such as, for example, the type of POI 406, the size of the POI 406, etc.

The autonomous vehicle 11 can also determine the location of the surrounding vehicles 402a, 402b, 402c, and 402d based on sensor data indicating the detected surrounding vehicles 402a, 402b, 402c, and 402d and/or on position data wirelessly received from the surrounding vehicles 402a, 402b, 402c and 402d. Based on the location of the POI 406 and the surrounding vehicles 402a, 402b, 402c and 402d, the autonomous vehicle ecosystem 400 can output driving commands that dynamically control the autonomous vehicle 11 and/or one or more of the surrounding vehicles 402a, 402b, 402c and 402d so that the obstruction of the POI 406 is removed. In at least one embodiment, the driving commands can include adjusting the spacing between the autonomous vehicle 11 and/or one or more of the surrounding vehicles 402a, 402b, 402c and 402d, controlling the speed of the autonomous vehicle 11 and/or one or more of the surrounding vehicles 402a, 402b, 402c and 402d, and changing the lane of the autonomous vehicle 11 and/or one or more of the surrounding vehicles 402a, 402b, 402c and 402d.

Figure 5:
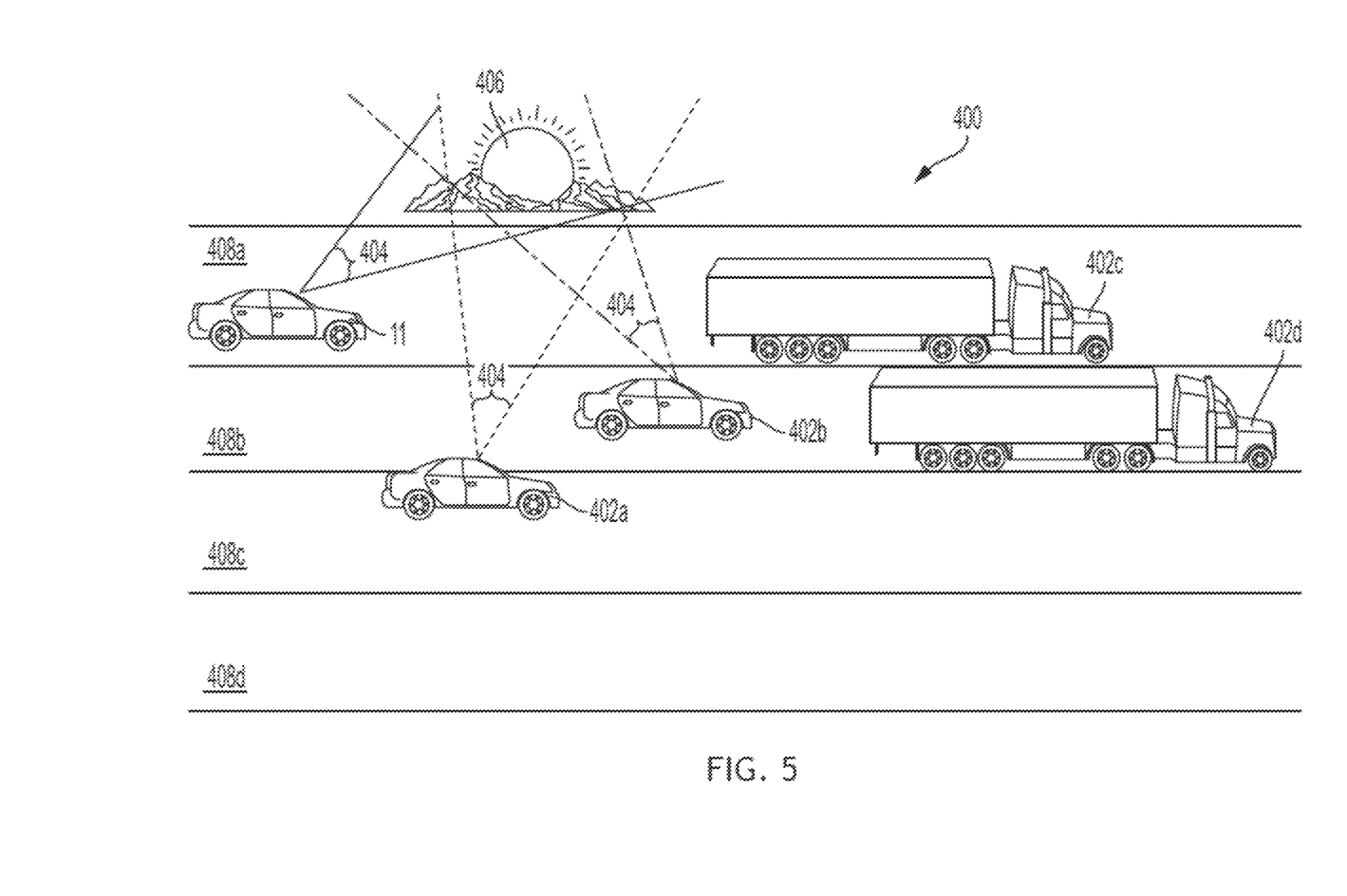
FIG. 5 illustrates a driving scenario following a dynamic re-positioning of autonomous vehicles to remove obstruction of the point of interest.

FIG. 5 illustrates the autonomous vehicle 11 and/or one or more of the surrounding vehicles 402a, 402b, 402c and 402d following a series of vehicle position adjustments (e.g., lane re-arrangements, speed adjustments, vehicle spacing adjustments, etc.) dynamically controlled by the autonomous vehicle ecosystem 400. Repositioning of the vehicles 11 and 402a, 402b, 402c, 402d can be facilitated using GPS coordinates indicating the actual position of each vehicle. At the same time the vehicles 11 and 402a, 402b, 402c, 402d also share their respective location, speed and direction of movement between one another, along with the autonomous vehicle ecosystem 400 (e.g., a controller installed in the autonomous vehicle ecosystem 400).

For example, the speed of surrounding vehicle 402c is increased so that autonomous vehicle 11 is autonomously re-located from lane 408b to lane 408a. In addition, surrounding vehicle 402b is re-located from lane 408c to lane 408b. In this manner, the speed of surrounding vehicle 402a can be increased so that its field of view is not obstructed by autonomous vehicle 11. Accordingly, the POI 406 is placed in the field of view 404 of the autonomous vehicle 11, along with surrounding vehicles 402a and 402b.

In at least one embodiment, the vehicles 11 and 402a, 402b, 402c, 402d can be re-positioned and controlled to continue their destination and ensure their destination is reached at the expected time. For example, the autonomous vehicle ecosystem 400 can consider real-time traffic flow, estimated time to arrive at the intended destination, length of the POIs around included in the travel route. Accordingly, the vehicles 11 and 402a, 402b, 402c, 402d can be re-positioned into different lanes so that one or more of the vehicles 11 and 402a, 402b, 402c, 402d can have an unobstructed FOV of the POI. After the POI is expired (e.g., can no longer be viewed), then the vehicles 11 and 402a, 402b, 402c, 402d can be realigned, and the speed adjusted, if necessary, to ensure the expected time to reach the destination is met.

In at least one non-limiting embodiment, the traveling route of an autonomous vehicle 11 can be preset to indicate a starting destination and an ending destination. Based on the traveling route, the autonomous vehicle ecosystem 400 can analyze map data to determine one or more POIs 406 that will be encountered during the trip, and can dynamically control the position of the vehicle 11 and/or other surrounding vehicles to ensure the field of view 404 is unobstructed.

Figure 6:
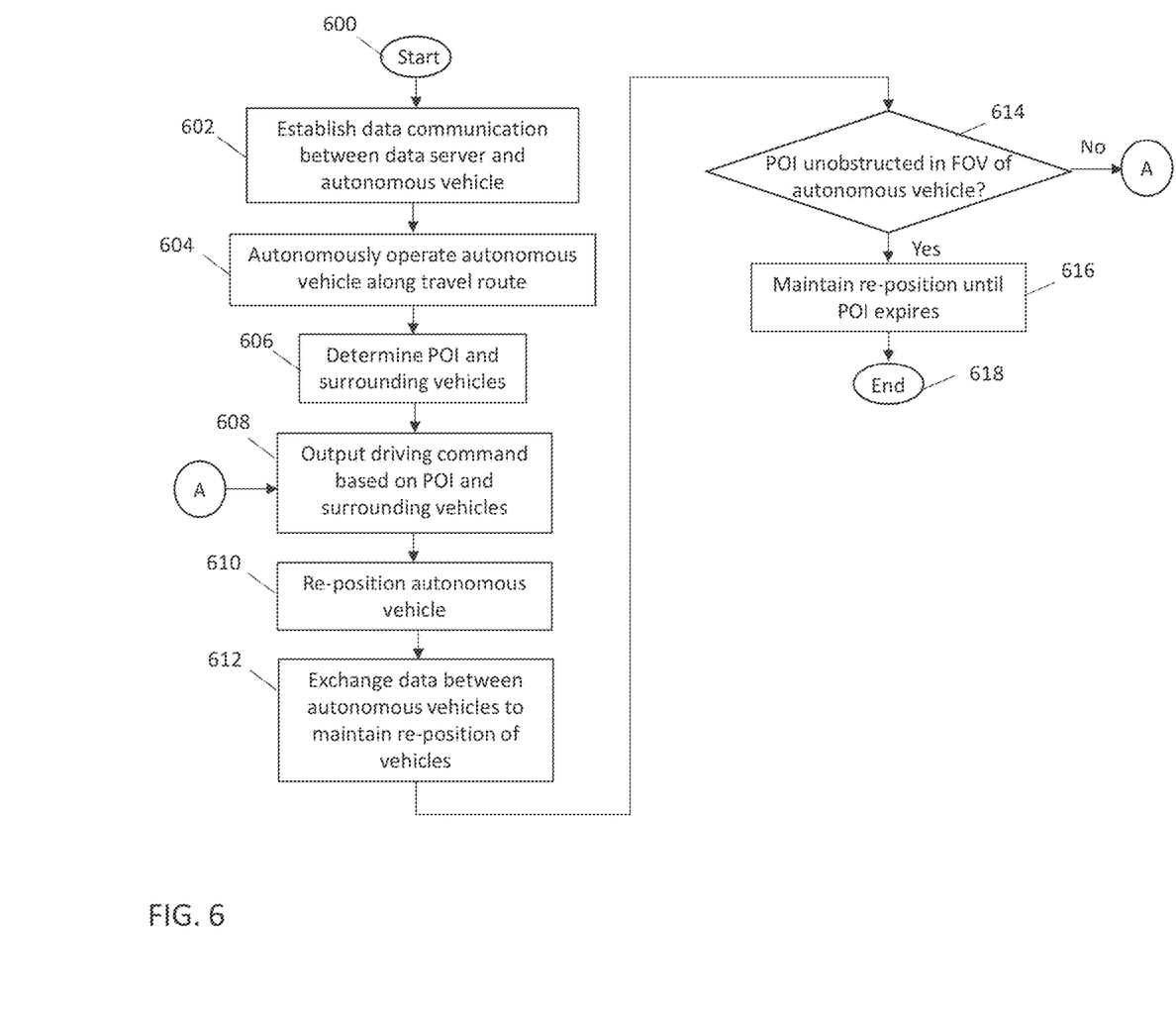
FIG. 6 is a flow diagram illustrates a method of controlling an autonomous vehicle operating in an autonomous vehicle system according to a non-limiting embodiment.

With reference now to FIG. 6, a flow diagram illustrates a method of controlling an autonomous vehicle operating in an autonomous vehicle system according to a non-limiting embodiment. The method begins at operation 600, and at operation 602, data communication is established between one or more autonomous vehicles and a data server. At operation 604, the autonomous vehicle is autonomously operated according to a travel route. At operation 606, a POI and one or more surrounding vehicles are determined. The POI can be determined, for example, by the data server using stored map data and/or according to POI data input by a passenger of the autonomous vehicle. At operation 608, the data server outputs driving commands based on the POI and the surrounding vehicles, and the autonomous vehicle is re-positioned at operation 610. At operation 612, the autonomous vehicles continuously exchange driving information between one another. Accordingly, the autonomous vehicles can dynamically control their position in order to achieve or maintain an unobstructed POI.

Turning to operation 614, a determination is made as to whether the POI is unobstructed with respect to a field of view (FOV) of the autonomous vehicle. When the POI remains obstructed, the method returns to operation 608 to output driving commands to continue re-positioning the autonomous vehicle. When, however, the POI is unobstructed, the re-positioned location of the autonomous vehicle is maintained until the POI expires at operation 616.

In at least one example, the autonomous vehicles can exchange driving information with one another to maintain the unobstructed FOV of the POI, and the method ends at operation 618.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An autonomous vehicle system comprising:
an electronic data server; and
an autonomous vehicle in signal communication with the data server via a communication network, the autonomous vehicle configured to travel autonomously according to a traveling route that includes a point of interest (POI),
wherein a passenger of the autonomous vehicle inputs a request to re-position the autonomous vehicle with respect to at least one surrounding autonomous vehicle located in a vicinity of the autonomous vehicle to establish an unobstructed view of the POI, and
wherein the data server outputs at a first driving command to control the autonomous vehicle and at least one second driving command to reposition the at least one surrounding autonomous vehicle with respect to the autonomous vehicle based, in part on, the POI included in the traveling route and the at least one surrounding autonomous vehicle located in a vicinity of the autonomous vehicle to establish the unobstructed view of the POI with respect to the autonomous vehicle.

2. The autonomous vehicle system of claim 1, wherein the at least one driving command includes at least one of adjusting a spacing between the autonomous vehicle and the at least one surrounding autonomous vehicle, controlling a speed of the autonomous vehicle, and changing a lane of the autonomous vehicle.

3. The autonomous vehicle system of claim 2, wherein the data server determines a position of the autonomous vehicle with respect to the at least one surrounding autonomous vehicle and generates the at least one driving command based at least in part on the position to reposition the autonomous vehicle such that the POI is unobstructed from a field of view of the autonomous vehicle.

4. The autonomous vehicle system of claim 2, wherein the at least one surrounding autonomous vehicle includes a second autonomous vehicle, and wherein the data server generates a first driving command to control the autonomous vehicle and a second driving command to control the second autonomous vehicle such that the POI is unobstructed from a field of view of the autonomous vehicle.

5. The autonomous vehicle system of claim 4, wherein the autonomous vehicle and the second autonomous vehicle output position data to the data server, and the data server generates the first and second driving commands based on the position data.

6. The autonomous vehicle system of claim 5, wherein the position data and a location of the POI are based at least on part on global position system (GPS) data corresponding to the autonomous vehicle and the second autonomous vehicle.

7. The autonomous vehicle system of claim 6, wherein the first and second driving commands re-positions the autonomous vehicle and the second autonomous vehicle with respect to one another such that the POI is unobstructed from a field of view of the autonomous vehicle.

8. The autonomous vehicle system of claim 7, wherein the autonomous vehicle and the second autonomous vehicle exchange the position data between one another, and wherein the autonomous vehicle autonomously controls its vehicle operations to maintain the re-position.

9. A method of controlling one or more autonomous vehicles operating in an autonomous vehicle system, the method comprising:
 establishing data communication between an electronic data server operating in a communication network and an autonomous vehicle;
 autonomously operating the autonomous vehicle along a traveling route;
 determining a point of interest (POI) included along the traveling route; and
 determining at least one surrounding autonomous vehicle located in a vicinity of the autonomous vehicle;
 receiving, from a passenger of the autonomous vehicle, a request to re-position the autonomous vehicle with respect to the at least one surrounding autonomous vehicle located in a vicinity of the autonomous vehicle to establish an unobstructed view of the POI;
 outputting a first driving command to control the autonomous vehicle and the at least one second driving command to reposition the at least one surrounding autonomous vehicle with respect to the autonomous vehicle based in part on the POI and the at least one surrounding autonomous vehicle located in a vicinity of the autonomous vehicle to establish the unobstructed view of the POI with respect to the autonomous vehicle.

10. The method of claim 9, wherein outputting the at least one driving command includes commanding the autonomous vehicle to perform at least of adjusting a spacing between the autonomous vehicle and the at least one surrounding autonomous vehicle, controlling a speed of the autonomous vehicle, and changing a lane of the autonomous vehicle.

11. The method of claim 10, further comprising:
 determining a position of the autonomous vehicle with respect to the at least one surrounding autonomous vehicle; and
 generating the at least one driving command based at least in part on the position to reposition the autonomous vehicle such that the POI is unobstructed from a field of view of the autonomous vehicle.

12. The method of claim 10, wherein the at least one surrounding autonomous vehicle includes a second autonomous vehicle, and wherein the method further comprises:
 generating, via the data server, a first driving command to control the autonomous vehicle; and
 generating, via the data server, a second driving command to control the second autonomous vehicle such that the POI is unobstructed from a field of view of the autonomous vehicle.

13. The method of claim 12, further comprising:
 outputting, via the autonomous vehicle and the second autonomous vehicle, position data to the data server; and
 generating, via the data server, the first and second driving commands based on the position data.

14. The method of claim 13, further comprising determining the position data and a location of the POI based at least on part on global position system (GPS) data corresponding to the autonomous vehicle and the second autonomous vehicle.

15. The method of claim 14, further comprising, re-positioning the autonomous vehicle and the second autonomous vehicle with respect to one another based on the first and second driving commands such that the POI is unobstructed from a field of view of the autonomous vehicle.

16. The method of claim 15, further comprising:
 exchanging the position data between the autonomous vehicle and the second autonomous vehicle; and
 autonomously controlling the autonomous vehicle based on the exchanged position data to maintain the re-position.

17. An autonomous vehicle included an autonomous vehicle system, autonomous vehicle comprising:
 a wireless vehicle communication system configured to exchange data with a remotely located electronic data server via a communication network; and
 a vehicle control system configured to autonomously drive the autonomous vehicle according to a traveling route that includes a point of interest (POI),
 wherein a passenger of the vehicle inputs a request to re-position the autonomous vehicle with respect to at least one surrounding autonomous vehicle located in a vicinity of the autonomous vehicle to establish an unobstructed view of the POI, and
 wherein the data server outputs at a first driving command to control the autonomous vehicle and at least one second driving command to reposition the at least one surrounding autonomous vehicle with respect to the autonomous vehicle based, in part on, the POI included in the traveling route and the at least one surrounding autonomous vehicle located in a vicinity of the autonomous vehicle to establish the unobstructed view of the POI with respect to the autonomous vehicle.

18. The autonomous vehicle of claim 17, wherein the at least one driving command repositions the autonomous vehicle with respect to the at least one surrounding autonomous vehicle such that the POI is unobstructed from a field of view of the autonomous vehicle.

19. The autonomous vehicle of claim 18, wherein the data further includes a current position of the autonomous vehicle and a location of the POI with respect to the autonomous vehicle.

20. The autonomous vehicle of claim 19, wherein the at least one driving command includes at least one of adjusting a spacing between the autonomous vehicle the at least one surrounding autonomous vehicle, controlling a speed of the autonomous vehicle, and changing a lane of the autonomous vehicle.

* * * * *